Nov. 26, 1974 R. L. NOWLIN 3,851,087
PROCESS FOR COUNTER CURRENT POMACE WASHING
Original Filed Jan. 8, 1971 3 Sheets-Sheet 1

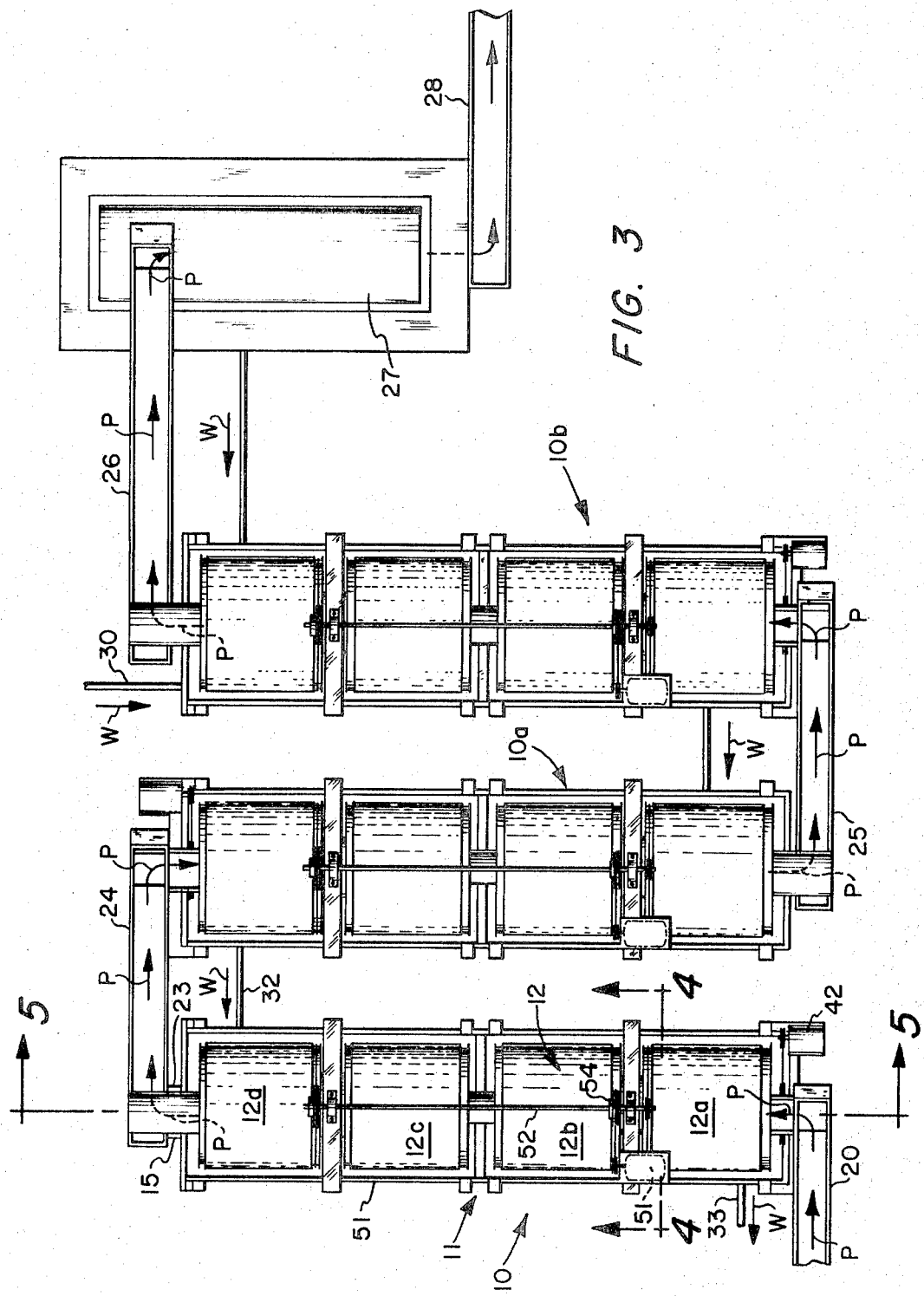

United States Patent Office 3,851,087
Patented Nov. 26, 1974

3,851,087
PROCESS FOR COUNTERCURRENT
POMACE WASHING
Radford L. Nowlin, 4124 S. Soderquist Road,
Turlock, Calif. 95380
Original application Jan. 8, 1971, Ser. No. 105,015, now Patent No. 3,749,002. Divided and this application Feb. 28, 1973, Ser. No. 336,882
Int. Cl. C12f 3/08; C12g 1/00
U.S. Cl. 426—425
2 Claims

ABSTRACT OF THE DISCLOSURE

Pomace is washed to recover alcohol or sugar by a countercurrent washing process involving advancing pomace in a rotating screen enclosed in a housing countercurrent to a wash liquid by submerging the pomace in the wash liquid, lifting the pomace to a point above the wash liquid along the inner wall of the screen reel as it rotates, allowing the pomace to fall onto a conveyor moving countercurrent to the wash liquid within the screen reel and allowing the pomace to fall from the conveyor to become resubmerged in the wash liquid.

RELATED CASE

This application is a divisional application of application Ser. No. 105,015, filed Jan. 8, 1971, by Radford L. Nowlin for Countercurrent Pomace Washer, which has issued as Pat. No. 3,749,002.

BACKGROUND OF THE INVENTION

The present invention relates in general to apparatus for recovering wines and juices from the skins and seeds of grapes, and more particularly to apparatus for recovering alcohol or sugar from pressed pomace.

In the production of wine and juices, waste material resulting therefrom is known as pomace, which constitutes the skins and the seeds of grapes. The pomace is pressed to recover therefrom all the usable wine and juices as a full strength product. The pomace remaining after pressing may be discarded or may be used to recover the remaining sugar and alcohol.

To recover the sugar and alcohol remaining after the pressing, it has been the practice to wash the pomace in tanks and subsequently press the pomace. The wash mixture ferments and has been distilled for producing a high proof alcohol. In some instances, the pomace is removed and washed during multiple cycle processes to recover the remaining usable alcohol and sugar. All the sugar is converted into alcohol, when the pomace is fermented dry. The pomace can then be run through a steam chamber and the alcohol recovered as a low wine distillate. It has been found that the foregoing methods are too expensive and inefficient.

SUMMARY OF THE INVENTION

A pomace washer comprising a screen reel with screen lifters disposed along the inside of the screen reel parallel to the axis thereof and spaced radially therealong at angular distances. A conveyor is located along the axis of the reel, whereby rotation of the reel causes the screen lifters to transfer pomace onto the conveyor.

A method of washing pomace in which a countercurrent flow of liquid wash advances through a screen reel with a conveyor along its axis thereof.

A method of washing pomace in which a countercurrent flow of liquid wash advances through a screen reel with a conveyor along the axis thereof and with plurality of screen lifters secured to the inside of the reel for transferring pomace onto the conveyor.

A pomace washer in which a screen reel is submerged in liquid wash and wherein the solid components of the pomace are maintained within the reel while the liquid wash from an external source flows through the screen reel.

A plurality of stages in which each stage includes a screen reel submerged in a liquid wash and the solid components of the pomace are left within the reel while liquid wash from an external source flows through the screen reel.

By virtue of the present invention, a high recovery efficiency is obtained with reduced usage of wash liquid. By increasing the recovery efficiency, the yield of sugar and alcohol is improved. By reducing the usage of wash liquid, a stronger solution is produced. The stronger the solution, the less costly is the further operation, because the wash liquid resulting from the process must be further acted upon by distillation or the like.

DESCRIPTION OF THE DRAWINGS

FIG. 3 is a plan view of the pomace washing system shown in FIG. 2.

DESCRIPTION OF THE PREFERRED
EMBODIMENTS

Figure 1:
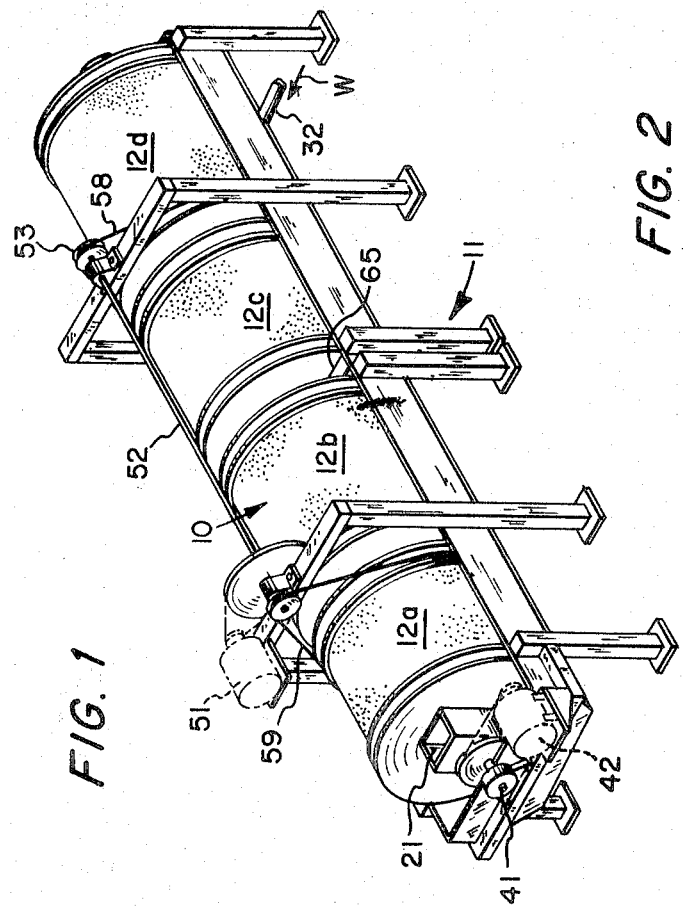
FIG. 1 is a perspective view of pomace washer apparatus embodying the present invention.

Illustrated in FIG. 1 is a pomace washing apparatus 10 embodying the present invention. In the exemplary embodiment of the present invention, three of such pomace washing apparatus 10b–10 (FIGS. 2 and 3) are included in the pomace washing system of the present invention. Each pomace washing apparatus is similar in structure and operation and, hence, only the pomace washing apparatus 10 will be described in detail.

Figure 4:
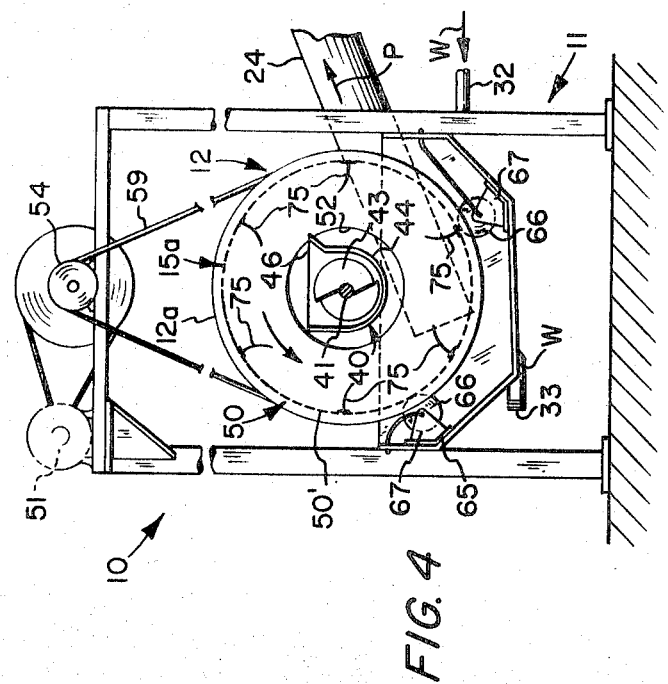
FIG. 4 is an enlarged vertical section taken along line 4—4 of FIG. 3.
Figure 5:
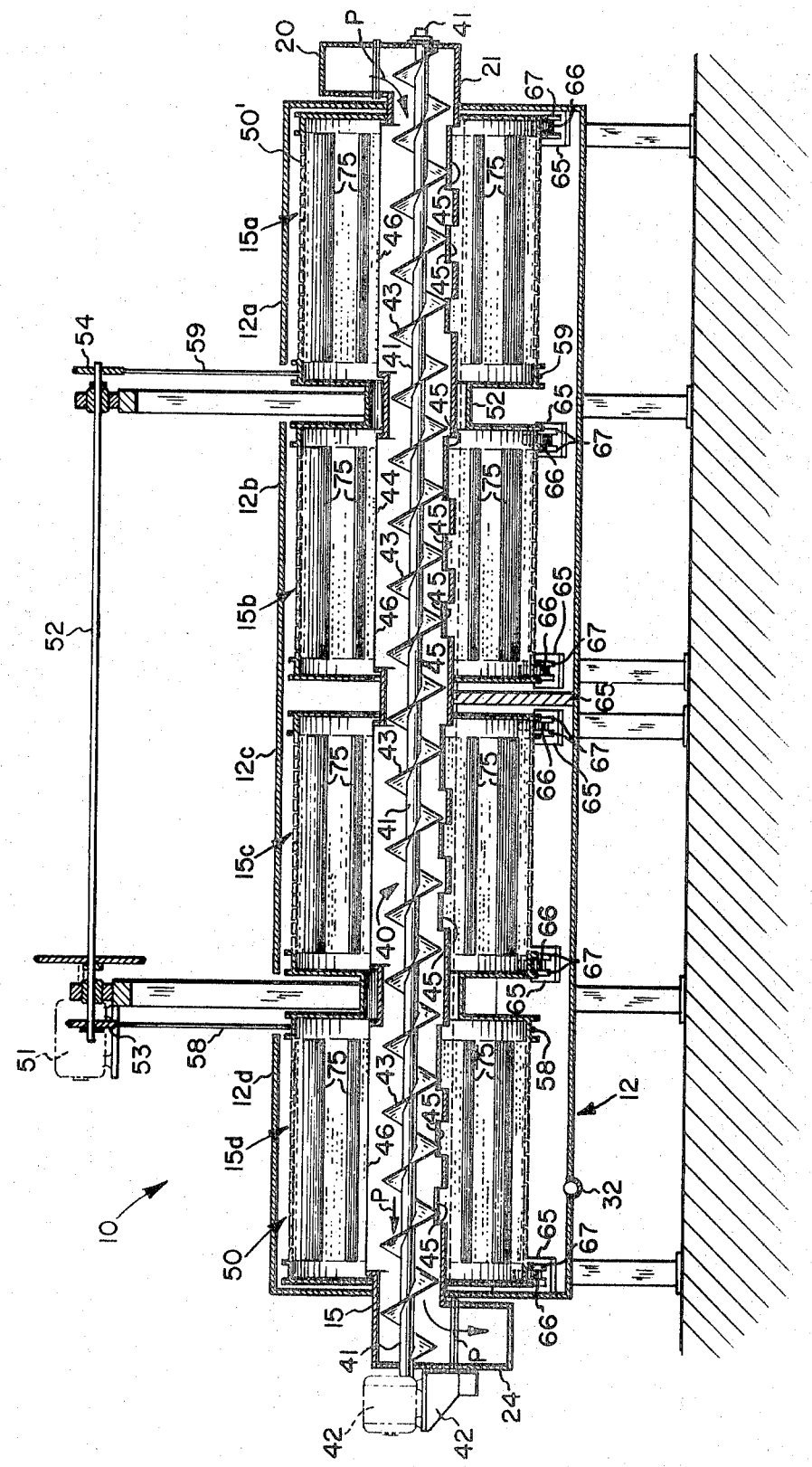
FIG. 5 is a longitudinal section taken along line 5—5 of FIG. 3 partially in elevation to illustrate the screw conveyor thereof.

The pomace washing apparatus 10 comprises a suitable support frame 11 (FIGS. 1–5) in which is supported a generally tubular housing 12. In the exemplary embodiment, the housing 12 includes four sections 12a–12d (FIGS. 1, 3, and 5). Within each section 12a–12d is a pomace washer, such as pomace washer 15a (FIGS. 4 and 5), embodying the present invention. Each pomace washer 15a–15d in the section 12a–13d, respectively, operates in a similar manner. Hence, only the pomace washer 15a in the section 12a will be described in detail.

Figure 2:
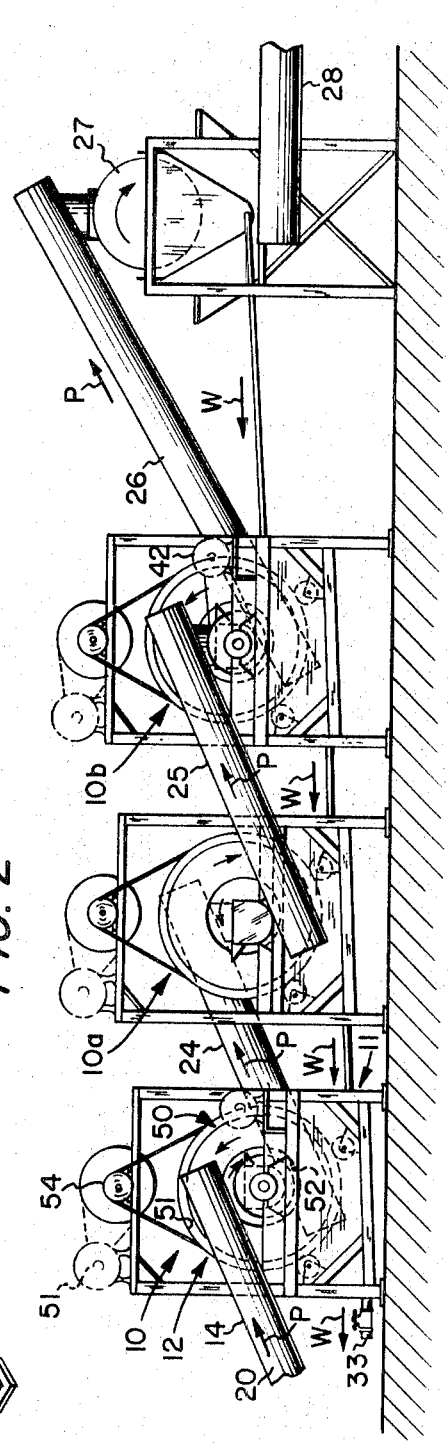
FIG. 2 is an elevation view of a pomace washing system embodying the present invention.

Initially, an operator places a supply of pomace, which may have been previously pressed to recover wine and juice, onto a conventional screw conveyor 20 (FIGS. 2, 3 and 5). Pomace is discharged from the screw conveyor 20 into a pomace receiving receptacle 21 for advancement into the interior of the housing 12. In a manner to be described hereinafter, pomace advances through the housing 12 in the direction of the arrow P (FIG. 3) and is discharged from the housing 12 through a pomace outlet 23. The pomace discharged from the outlet 23 is discharged onto a conventional screw conveyor 24 for discharge into the pomace washing apparatus 10a. From the pomace washing apparatus 10a, pomace is advanced by a conventional screw conveyor 25, for discharge into the pomace washing apparatus 10b. Pomace discharged from the pomace washing apparatus 10b is advanced by a conventional screw conveyor 26 into a well-known press machine 27. The dry pomace discharged from the press machine 27 is advanced by a conveyor 28 to be discarded as waste material.

During the time the pomace P advances from the conveyor 20 and through the pomace washing apparatus 10–10b, in succession, wash liquid, such as water, is supplied to the pomace washing apparatus 10b through a conduit 30. A mixture of wash liquid, juice and wine (hereinafter referred to as "mixture") advances in the direction of the arrows W (FIG. 3) in succession through the pomace washing apparatus 10b, 10a and 10. The mixture advances through the pomace washing apparatus 10b–10, while pomace advances through the pomace washing apparatus 10–10b. The passage of the mixture through the housing 12 of the pomace washing apparatus 10 will be described in detail hereinafter.

The housing 12 includes an inlet conduit 32 through which passes the mixture discharged from the pomace washing apparatus 10a. In addition, the housing 12 includes a discharge outlet from which is discharged the final mixture for the recovery of sugar and alcohol. Juice and wine recovered from the pressing of pomace from the pressing machine 27 is discharged into the pomace washing apparatus 10b. The mixture discharged from the conduit 33 is processed in a conventional manner for producing therefrom sugar and alcohol.

Disposed within the housing 12 along the axis thereof is a conventional screw conveyor 40 (FIGS. 4 and 5) which comprises a drive shaft 41. The drive shaft is journalled by suitable bushing carried by the end walls of the housing 12. Connected to the drive shaft 41 is a conventional varidrive motor 42, which imparts rotation to the shaft 41. Fixed to the shaft 41 for rotation therewith are a plurality of well-known screw-like impeller blades 43.

A suitable trough 44 of the screw conveyor 40 is disposed below and along the sides of the screw impeller blades 43 to gather pomace so that the screw impeller blades 43 can advance the pomace in the trough 44 in the direction of the arrow P. The trough is open at the top thereof and the screw impeller blades 43 are suitably exposed from above so that pomace can be cast into the trough 44 to be advanced by the blades 43. Suitably spaced small openings 45 are formed in the bottom wall of the trough 44 so that the pomace in the trough 44 can be exposed and re-exposed to the mixture. An apron 46 serves to guide the pomace into the trough 44.

Disposed within the housing 12 and surrounding the screw conveyor 40 is a screen reel 50 (FIGS. 4 and 5), which includes an increased diameter wall 50' and a reduced diameter wall 52. The reduced diameter wall 52 is disposed between successive sections of the housing 12 and at each end of the housing 12. In this manner, the end walls of the housing 12 form supports from which the screen reel 50 is journalled for rotation. For imparting rotation to the screen reel 50, a suitable motor 51 is carried by the frame 11. A drive shaft 52 is driven by the motor 51 through a suitable sheave and belt arrangement. Fixed to the shaft 52 for rotation therewith are pulleys 53 and 54. Trained around the pulleys 53 and 54 and the reel 50 are suitable endless chains 58 and 59 to impart rotation to the reel 50. A support 65 is mounted on the frame 11 below a reduced diameter portion of the reel 50. Brackets 67 with idler rollers 66 thereon engage the reel 50 for supporting the same. The reel 50 and the screw conveyor 40, in the preferred embodiments, rotate in opposite directions.

On the inside wall of the reel 50 along each enlarged diameter portion 50' thereof are lifters 75. The lifters 75 are spaced equal angular distances apart and extend in a direction parallel to the axis of the reel 50. The lifters 75 are made from a screen material, similar to the reel 50, and serve to transfer solid material pomace out of the mixture or liquid wash and cast the pomace onto the screw conveyor 40 adjacent thereto. The lifters 75 are suitably bent to assist in the lifting and casting action. More specifically, the rotation of the reel 50 causes the lifters 75 to lift pomace submerged in the wash liquid or mixture and cast the same onto the conveyor 40 adjacent thereto, whereby the pomace is drained with each lifting action to permit exposure and re-exposure to the advancing mixture. It is intended that the wash liquid and mixture will flow in the direction of the arrow W until it reaches the outlet conduit 33 at which time it can be pumped to a storage vessel for further processing. Wash liquid or mixture enters into the housing and flows through the screen reel 50 from a direction externally of the wall 51. The screen reel 51 is disposed in the wash liquid or mixture and the level thereof will at all times be slightly lower than the conveyor 40. The pomace on the other hand enters the housing so as to be always contained within the screen reel 50. It is to be observed that the pomace advances in one direction while the mixture or wash liquid flows in an opposite direction in a countercurrent manner.

I claim:

1. A method of recovering alcohol or sugar from pomace obtained in the production of fermented or unfermented juices comprising the steps of:
   (a) introducing a wash liquid into one end of a housing, there being a screen reel disposed within said housing with one end of said screen reel in the vicinity of said one end of said housing;
   (b) advancing the wash liquid toward the opposite end of said screen reel while maintaining the lower portion of said screen reel submerged in the liquid wash;
   (c) introducing pomace into said screen reel at said opposite end of said screen reel;
   (d) submerging the pomace in the advancing wash liquid;
   (e) lifting the pomace along the inner wall of said screen reel above the wash liquid by rotating said screen reel to permit partial draining of the pomace;
   (f) dropping the pomace from the inner wall of said rotating screen reel onto a conveyor advancing through the screen reel;
   (g) advancing the pomace on said conveyor toward said one end of said rotating screen reel;
   (h) dropping the pomace while being advanced by said conveyor from said conveyor and into the liquid wash to be resubmerged in the liquid wash;
   (i) repeating the steps of lifting the pomace above the liquid wash, partially draining the pomace, dropping the pomace onto said conveyor, advancing the pomace on said conveyor through the screen reel and dropping the pomace from said conveyor for resubmergence in the liquid wash for exposing and re-exposing the pomace to the countercurrent flow of liquid wash;
   (j) removing the liquid wash at said opposite end of said housing; and
   (k) recovering alcohol or sugar from said liquid wash.

2. The method as claimed in claim 1 wherein said conveyor is located in the vicinity of the axis of said rotating screen reel.

References Cited

UNITED STATES PATENTS

| | | | |
|---|---|---|---|
| 3,632,445 | 1/1972 | Barre | 23—270 R |
| 2,998,307 | 8/1961 | Walker | 23—269 |

OTHER REFERENCES

Amerine et al.: The Technology of Wine Making, 2nd ed., The Ar. Publ. Co., Inc., Westport, Conn., 1967 (pp. 20, 3 and 254).

DAVID M. NAFF, Primary Examiner

U.S. Cl. X.R.

23—269; 99—275, 536; 426—431, 478, 489